(No Model.)
J. H. GRAY.
METALLIC HUB.
No. 518,498. Patented Apr. 17, 1894.
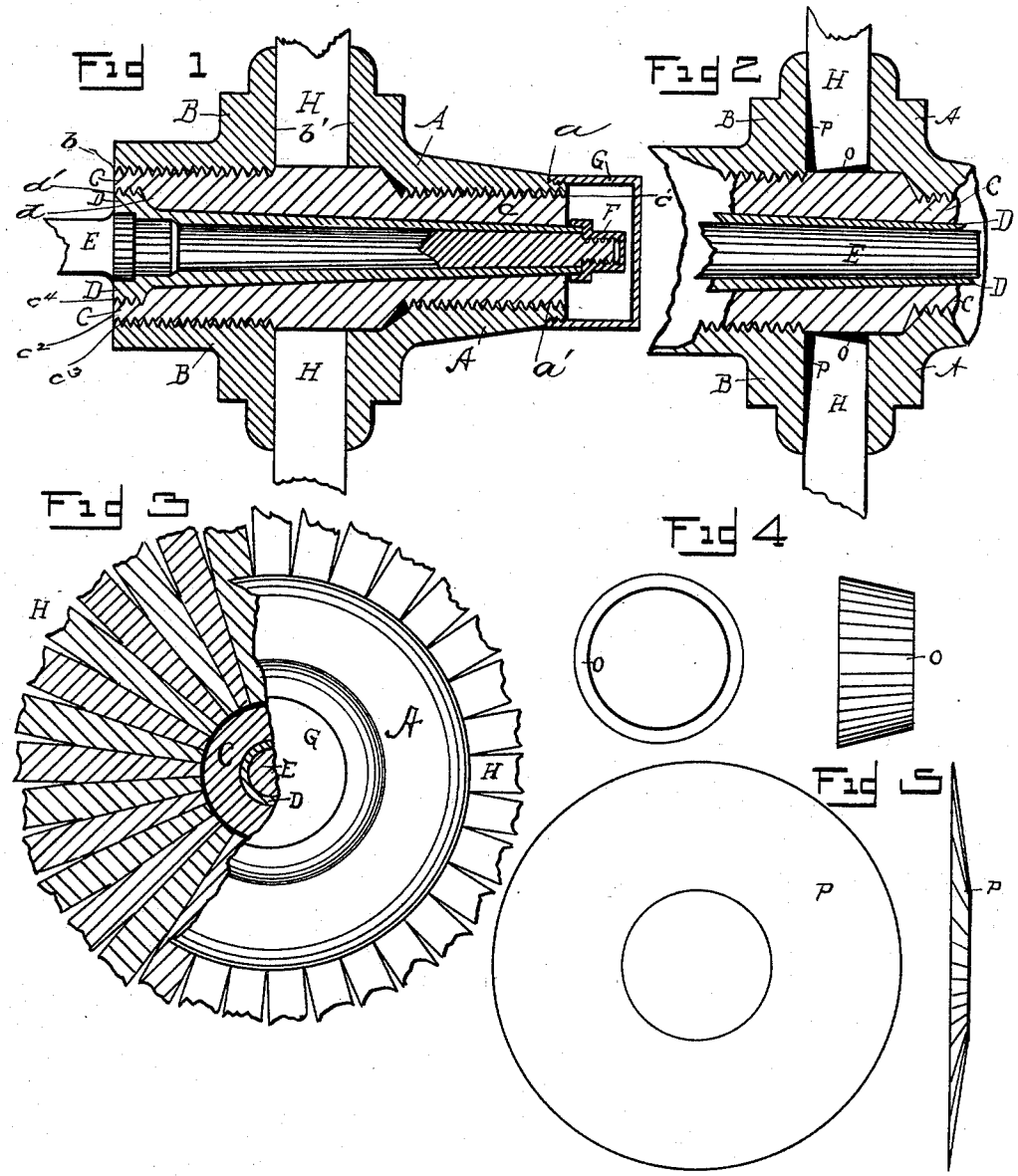
WITNESSES:
C. E. Clark
W. L. Clark
John H. Gray,
INVENTOR
BY Wm. N. Moore,
ATTORNEY.

UNITED STATES PATENT OFFICE.

JOHN H. GRAY, OF ELWOOD, NEBRASKA, ASSIGNOR OF ONE-HALF TO ROLLAND N. BOUCK, OF JACKSON, MICHIGAN.

METALLIC HUB.

SPECIFICATION forming part of Letters Patent No. 518,498, dated April 17, 1894.

Application filed December 24, 1891. Serial No. 416,090. (No model.)

*To all whom it may concern:*

Be it known that I, JOHN H. GRAY, a citizen of the United States, residing at Elwood, in the county of Gosper and State of Nebraska, have invented a new and useful hub to be used in all kinds of wheels wherein the hub and spoke enter as a necessary part for its use and application, of which the following is a specification.

My invention relates to improvements in hubs for vehicles and refers especially to a metallic hub, and the object of my invention is the provision of a hub which will possess merit in point of simplicity, durability, cheapness and efficiency and thus prove a practical improvement.

The invention consists of a metallic hub embodying novel features of construction and combination of parts substantially as disclosed herein.

In order that the details of construction of my hub and the advantages arising therefrom will be understood I invite attention to the accompanying drawings.

Figure 1 represents a vertical sectional view of my hub. Fig. 2 represents a similar view with collar and washer in place. Fig. 3 represents an elevation of the hub partly in section. Fig. 4 represents detail views of the collar or sleeve and Fig. 5 represents detail views of the washer.

In the drawings—A designates the outer section of the hub having the outer threads $a$ and the interior threads $a'$, and B designates the inner section having the interior threads $b$ and between the flanges $b'$ of these sections are clamped the spokes H.

In the sections A and B is received the sleeve C having the reduced end $c$ provided with exterior threads $c'$ and the larger inner end $c^2$ having threads $c^3$, the threads on the sleeve engaging those of the clamping sections, and in the sleeve bore is placed the skein D, having the shoulder $d$, provided with exterior threads $d'$ which engage the threads $c^4$ of the sleeve and secure the skein in the sleeve and in the skein fits the axle E, the outer threaded end of which receives the nut F and the dust cap G screws upon the section A.

To secure the spokes more effectively in place I provide the beveled collar O which surrounds the sleeve and the beveled washer P, which are arranged as shown in Fig. 2 and act as wedges to hold the spokes.

It will be seen that I provide a hub made entirely of metal and the parts of which fit snugly together and hold the spokes firmly and provide a simple, durable, cheap and entirely practical hub.

I claim—

1. A hub consisting of the two clamping sections, the spokes fitting between the flanges thereof, the sleeve fitting in the sections, the collar surrounding the sleeve, the washer adjacent to the sleeve, the spokes resting against the sleeve and collar and the skein in the sleeve.

2. A hub consisting of the two clamping sections, the spokes secured between the flanges of the sections, the beveled sleeve and washer wedging the spokes the sleeve having the reduced and enlarged ends engaging the sections, and the skein fitting in the sleeve and having the threaded shoulder.

3. A hub consisting of the clamping sections, the spokes between the same, the sleeve fitting in the clamping sections, and the collar and washer serving as wedges for the spokes, as described.

JOHN H. GRAY.

Witnesses:
A. R. ROSE,
H. M. HARE.